United States Patent
Bhatia et al.

(10) Patent No.: US 9,671,785 B1
(45) Date of Patent: Jun. 6, 2017

(54) V2X OBJECT-LOCATION VERIFICATION SYSTEM FOR AUTOMATED VEHICLES

(71) Applicant: Delphi Technologies, Inc., Troy, MI (US)

(72) Inventors: Gaurav Bhatia, Pittsburgh, PA (US); Jong Ho Lee, Pittsburgh, PA (US); Junsung Kim, Pittsburgh, PA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/083,538

(22) Filed: Mar. 29, 2016

(51) Int. Cl.
   *G05D 1/02* (2006.01)

(52) U.S. Cl.
   CPC ......... *G05D 1/0231* (2013.01); *G05D 1/0257* (2013.01)

(58) Field of Classification Search
   CPC ........................... G05D 1/0231; G05D 1/0257
   USPC ............................................................ 701/23
   See application file for complete search history.

(56) References Cited

U.S. PATENT DOCUMENTS

| | | | |
|---|---|---|---|
| 9,314,924 B1* | 4/2016 | Laurent | B25J 9/163 |
| 2016/0121482 A1* | 5/2016 | Bostick | G05D 1/0016 700/257 |
| 2016/0291155 A1* | 10/2016 | Nehmadi | G01C 3/08 |
| 2016/0318531 A1* | 11/2016 | Johnson | B61L 25/02 |
| 2016/0321551 A1* | 11/2016 | Priness | G06N 5/047 |
| 2016/0332574 A1* | 11/2016 | Park | H04N 7/181 |

* cited by examiner

Primary Examiner — McDieunel Marc
Assistant Examiner — James E Stroud
(74) Attorney, Agent, or Firm — Lawrence D. Hazelton

(57) ABSTRACT

An object-detection system suitable for use in an automated vehicle includes a transceiver, and object-detector, and a controller. The transceiver is suitable to install on a host-vehicle. The transceiver is used to receive an indicated-location of an object proximate to the host-vehicle. The object-detector is suitable to install on the host-vehicle. The object-detector is used to detect a relative-location of the object relative to the host-vehicle. The controller is in communication with the transceiver and the object-detector. The controller determines a confirmed-location of the object relative to the host-vehicle based on the indicated-location and the relative-location. Determining the confirmed-location of the object allows for selecting from a variety of optimized algorithms to better track subsequent expected motion of the object, and reducing the risk of unnecessary or erratic action by the host-vehicle caused by hacking of the wireless-transmission or deliberate malicious content in the wireless-transmission.

6 Claims, 2 Drawing Sheets

V2X OBJECT-LOCATION VERIFICATION SYSTEM FOR AUTOMATED VEHICLES

TECHNICAL FIELD OF INVENTION

This disclosure generally relates to an object-detection system suitable for use in an automated vehicle, and more particularly relates to determining a confirmed-location of an object relative to the automated vehicle based on correspondence of an indicated-location and a relative-location of the object.

BACKGROUND OF INVENTION

The operation of automated vehicles or autonomous vehicles generally requires reliable information about the location of mobile objects such as pedestrians and other vehicles including bicycles. Vehicle-to-vehicle (V2V) communications and vehicle-to-pedestrian (V2P) communications, generically referred to as V2X communications, may be intermittent or may be maliciously altered, hacked, or 'spoofed' so the V2X information received by a host-vehicle is wrong. For example, a hacker may cause V2X information about the actual location or motion vector of a pedestrian or an other-vehicle (an object) to indicate that the object has or is about to cross or enter the present travel-path of the host-vehicle, when actually no object is present. The false indication of the mobile-object proximate to the travel-path may cause the host-vehicle to unnecessarily slow-down or apply brakes, and thereby possibly cause a collision of vehicles.

The host-vehicle may be equipped to directly determine information about the presence of objects such as pedestrians or other-vehicles proximate to the host-vehicle. For example, a camera, radar, lidar, or any combination thereof may be used to detect the presence of various potentially mobile objects. However, the field-of-view of these devices may be obstructed by another vehicle such as large truck, or by snow or dirt on the device.

SUMMARY OF THE INVENTION

In accordance with one embodiment, an object-detection system suitable for use in an automated vehicle is provided. The system includes a transceiver, and object-detector, and a controller. The transceiver is suitable to install on a host-vehicle. The transceiver is used to receive an indicated-location of an object proximate to the host-vehicle. The object-detector is suitable to install on the host-vehicle. The object-detector is used to detect a relative-location of the object relative to the host-vehicle. The controller is in communication with the transceiver and the object-detector. The controller determines a confirmed-location of the object relative to the host-vehicle based on the indicated-location and the relative-location.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
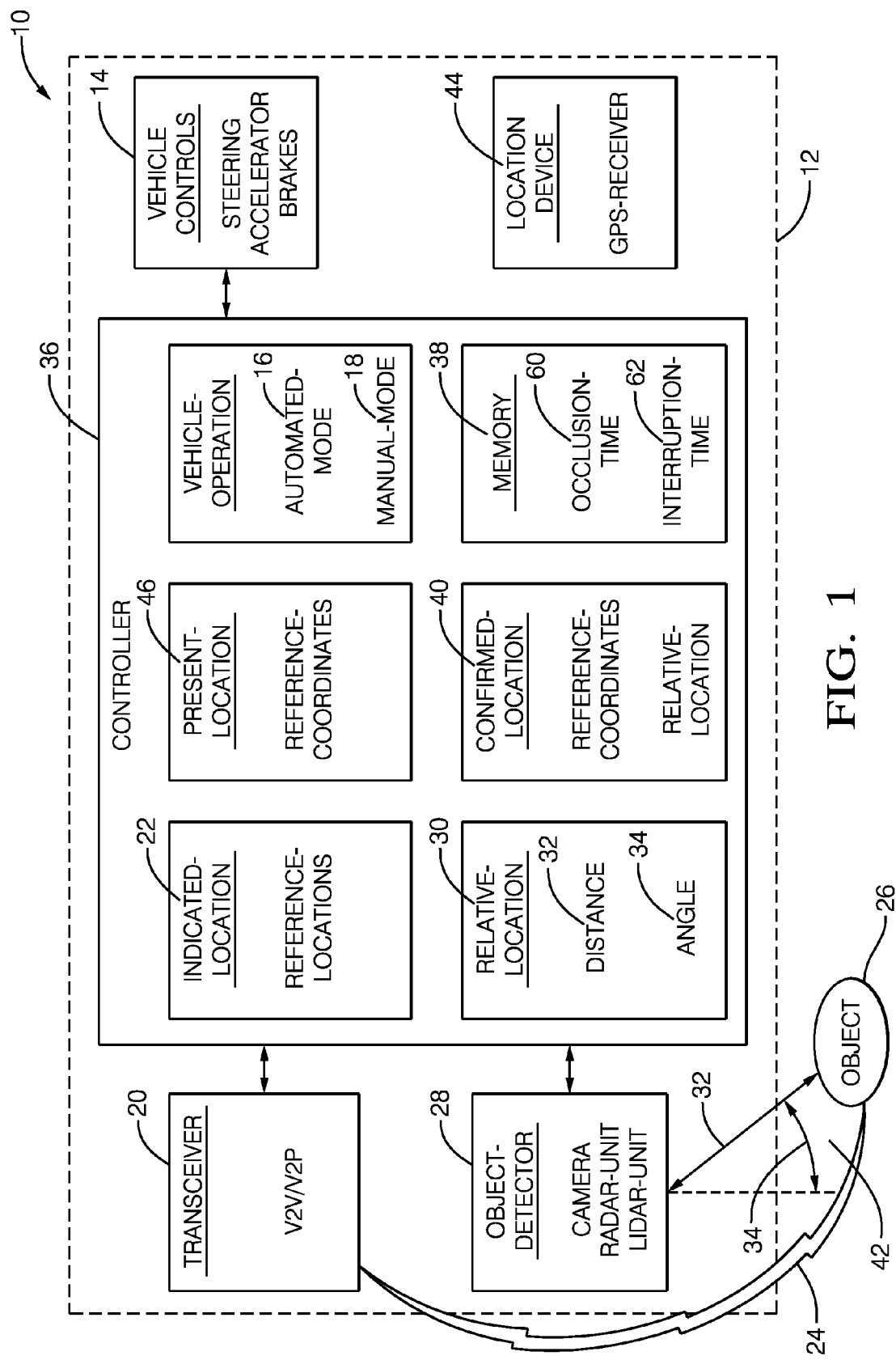
FIG. 1 is a diagram of an infrastructure-device status-verification system in accordance with one embodiment.

FIG. 1 illustrates a non-limiting example of an object-detection system 10, hereafter the system 10, which is suitable for use by an automated vehicle, hereafter the host-vehicle 12. While the description and examples presented herein are generally directed to fully-automated or autonomous vehicles, it is contemplated that the advantages of the system 10 described herein are applicable to partially automated vehicles where assistance is provided to an operator of the host-vehicle 12 who is generally in control of the vehicle-controls 14 of the host-vehicle 12. That is, the host-vehicle 12 may be operated in an automated-mode 16 (i.e. fully-automated) or a manual-mode 18, or a partial blend of those two modes.

The system 10 includes a transceiver 20 suitable to install on the host-vehicle 12. In general, the transceiver 20 is used to receive, via a wireless-transmission 24, an indicated-location 22 of an object 26 proximate to the host-vehicle 12. By way of example and not limitation, the object 26 may be an other-vehicle 54 (FIG. 2) or a pedestrian 64 proximate to the host-vehicle 12. The indicated-location 22 may be, for example, transmitted from the object 26 using the known radio-frequency vehicle-to-vehicle (V2V) or vehicle-to-pedestrian (V2P) protocol, which is often generically referred to as V2X communications.

The system 10 also includes an object-detector 28 suitable to install on the host-vehicle 12. The object-detector 28 is used to determine a relative-location 30 of the object 26. The relative-location 30 may be determined based on measurements, data, and/or observations of the object 26 detected by the object-detector 28. The object-detector 28 may include, but is not limited to, a camera, a radar-unit, a lidar-unit, or any combination thereof. By way of example and not limitation, the relative-location 30 may be based on a distance 32 and an angle 34 measured by the radar-unit or the lidar-unit of the object-detector 28. Alternatively, the relative-location 30 of the object 26 may be determined based on where the object 26 is positioned in an image taken by the camera of the object-detector 28.

The system 10 also includes a controller 36 in communication with the transceiver 20 and the object-detector 28. The controller 36 may include a processor (not specifically shown) such as a microprocessor or other control circuitry such as analog and/or digital control circuitry including an application specific integrated circuit (ASIC) for processing data as should be evident to those in the art. The controller 36 may include memory 38, including non-volatile memory, such as electrically erasable programmable read-only memory (EEPROM) for storing one or more routines, thresholds, and captured data. The one or more routines may be executed by the processor to perform steps for determining a confirmed-location 40 of the object 26 based on the indicated-location 22 and the relative-location 30 which are received by the controller 36 for verifying the actual location (the confirmed-location 40) of the object 26 as described herein. As will become apparent upon reading of the non-limiting examples that follow, the confirmed-location 40 is generally established when the indicated-location 22 and the relative-location 30 correspond, match, or indicate the same location for the object 26. If the indicated-location 22 and the relative-location 30 don't correspond, it may be due to malicious spoofing, or due to the field-of-view 42 between the object-detector 28 and the object 26 being occluded, or interference of the wireless-transmission 24.

The system 10 may also include a location-device 44 used to determine a present-location 46 of the host-vehicle 12. By way of example and not limitation, the location-device 44 may be a global-positioning-system receiver (GPS-receiver). However, other means to indicate location are envisioned such as distance and direction relative to an observable landmark that is also present on a digital map such as a building or traffic-signal for example. The controller 36 may be further configured to determine the confirmed-location 40 based on the present-location 46, in combination with the indicated-location 22 and the relative-location 30. Preferably, the indicated-location 22 of the object 26 and the present-location 46 of the host-vehicle 12 are both specified with respect to the same reference-coordinates. For example, world-coordinates may be used where by the various locations are expressed in terms of latitude, longitude, and elevation. Alternatively, the various locations may be translated or transposed to be expressed in Cartesian coordinates (X, Y, Z) or polar coordinates (range, yaw-angle, elevation-angle) relative to the host-vehicle 12 where some point on the host-vehicle 12 (e.g. the center of the front bumper) is the reference-location (e.g. 0,0,0).

Figure 2:
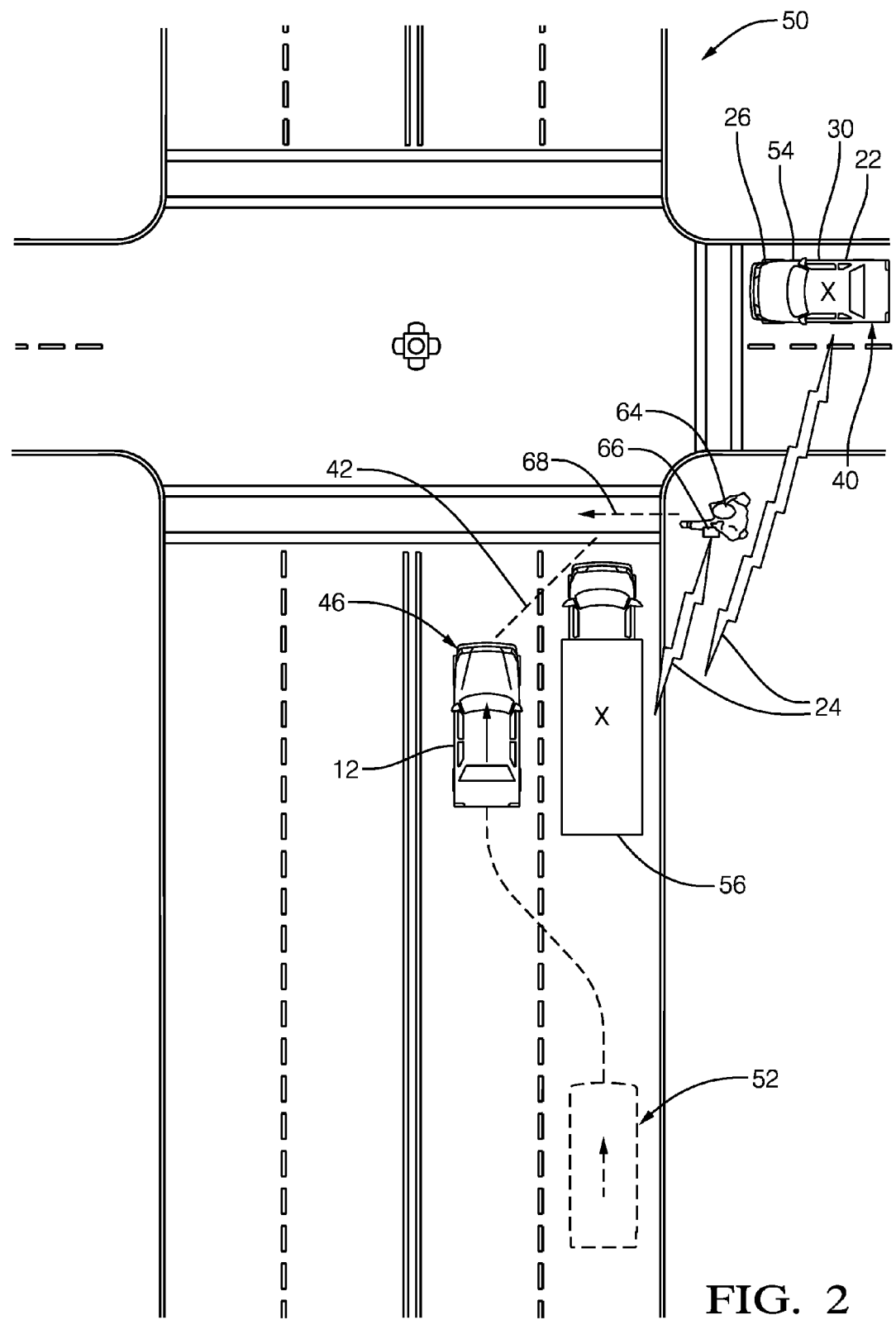
FIG. 2 is a traffic-scenario encountered by the system of FIG. 1 in accordance with one embodiment.

FIG. 2 illustrates a non-limiting example of a traffic-scenario 50 that may be encountered by the host-vehicle 12 equipped with the system 10. In this example, the host-vehicle 12 travels from a prior-location 52 to the present-location 46 which includes changing lanes to travel around a stopped-truck 56. From the prior-location 52, the object-detector 28 is able to detect the presence of the object 26, which in this example is the other-vehicle 54 at the relative-location 30. The transceiver 20 in the host-vehicle 12 is also able to receive the wireless-transmission 24 from the other-vehicle 54, where the wireless-transmission 24 includes or conveys the indicated-location 22 of the other-vehicle 54.

When the indicated-location 22 and the relative-location 30 correspond or are approximately the same, the actual location of the other-vehicle 54 is confirmed, i.e. the confirmed-location 40 is registered by the controller 36, and the identity of the object 26 is more confidently established. The fact that the identity of the object 26, in this case a vehicle (the other-vehicle 54 vs. an immobile object), is more confidently established can be used by the controller 36 to more predictably track motion of the other-vehicle 54 using the object-detector 28. For example, because of the location of the other-vehicle 54 relative to the intersection illustrated is known, the expected direction of travel is to the left (i.e. into the intersection) as viewed by the object-detector 28. The algorithms used by the controller 36 to detect that leftward movement can be optimized or selected to better detect that leftward movement. By contrast, while the stopped-truck 56 is presently not moving, if it did start moving the expected direction of travel is forward, i.e. directly away from the host-vehicle 12 when the host-vehicle 12 is at the prior-location 52, so the signal processing algorithms selected by the controller 36 to process signals from the object-detector 28 can be optimized to detect motion in that forward direction.

Assume that the confirmed-location 40 is established because the relative-location 30 and the indicated-location 22 match when the host-vehicle 12 is at the prior-location 52. However, but as the host-vehicle 12 travels to the present-location 46 the field-of-view 42 of the object-detector 28 may become occluded by the stopped-truck 56 so the relative-location 30 becomes indeterminate. The system 10, or more specifically the controller 36, may be configured to maintain the confirmed-location 40 based only on the indicated-location 22 for an occlusion-time 60 (e.g. thirty seconds) as long as the indicated-location 22 remains unchanged. Similarly, the controller 36 may be configured to maintain the confirmed-location 40 based only on the relative-location 30 (determined using the object-detector) for an interruption-time 62 (e.g. thirty seconds) when reception of wireless-transmission 24 used to determine the indicated-location 22 is interrupted by, for example, electrical noise or other interference including jamming of the wireless transmission with malicious intent.

Just as vehicle-to-vehicle (V2V) communications may be used to determine the indicated-location 22 of the other-vehicle 54, it has been suggested that vehicle-to-pedestrian (V2P) communications may be used to track movement of the pedestrian 64. By way of example and not limitation, the wireless-transmission 24 from the pedestrian 64 may originate from a personal-communications-device 66, e.g. a smart-phone. When the host-vehicle is at the prior-location 52, the presence and actual location of the pedestrian 64 may be confirmed because the object-detector 28 'sees' the pedestrian 64, and the location indicated by the wireless transmission 24 from the personal-communications-device 66 match or correspond.

As the host-vehicle 12 travels to the present-location 46, the field-of-view 42 of the object-detector 28 to the illustrated location of the pedestrian 64 may become occluded by the stopped-truck 56. As an example of jamming with malicious intent by some undetected third party, or spoofing by the pedestrian 64, the content of the wireless-transmission 24 may be manipulated to indicate that the pedestrian 64 as suddenly moved in front of the stopped-truck 56 as indicated by arrow 68. If not for the confirmation of location provided by the object-detector 28 being able to see the area in front of the stopped-truck 56 from the present-location 46, a system that only operated based on V2X communications may unnecessarily slow-down or stop the host-vehicle 12. That is, because the object-detector 28 can see that the pedestrian 64 as not actually moved in front of the stopped-truck 56, the host-vehicle 12 may continue to travel uninterrupted.

Accordingly, an object-detection system (the system 10) suitable for use in an automated vehicle, a controller 36 for the system 10 and a method of operating the system 10 is provided. By determining the confirmed-location 40 of the object 26 based on agreement of the indicated-location 22 and the relative-location 30, the actual presence, identity, and location of the object 26 may be determined with a greater degree of confidence. That the identity of the object and actual location is confidently known allows the controller 36 to, for example, select from a variety of optimized algorithms to better track subsequent expected motion of the object 26. Furthermore, by having the indicated-location 22 confirmed by the relative-location 30, the risk of unnecessary or erratic action by the host-vehicle 12 caused by hacking of the wireless-transmission 24 or deliberate malicious content in the wireless-transmission 24 is reduced.

While this invention has been described in terms of the preferred embodiments thereof, it is not intended to be so limited, but rather only to the extent set forth in the claims that follow.

We claim:

1. An object-detection system for an automated vehicle, said system comprising:

a transceiver that receives an indicated-location of an object proximate to a host-vehicle, wherein the indicated-location is transmitted by the object;

an object-detector that detects a relative-location of the object relative to the host-vehicle; and a controller in communication with the transceiver and the object-detector, wherein the controller determines a confirmed-location of the object relative to the host-vehicle based on the indicated-location and the relative-location when the indicated-location corresponds to the relative-location.

2. The system in accordance with claim 1, wherein the system includes a location-device used to determine a present-location of the host-vehicle, and the controller further determines the confirmed-location based on the present-location.

3. The system in accordance with claim 2, wherein the indicated-location of the object and the present-location of the host-vehicle are both specified with respect to a reference-coordinate.

4. The system in accordance with claim 1, wherein the object is one of an other-vehicle and a pedestrian proximate to the host-vehicle.

5. The system in accordance with claim 1, wherein the controller maintains the confirmed-location for an occlusion-time when a field-of-view between the object-detector and the object is occluded after the confirmed-location is established.

6. The system in accordance with claim 1, wherein the controller maintains the confirmed-location for an interruption-time when reception of the indicated-location by the transceiver is intermittent after the confirmed-location is established.

\* \* \* \* \*